United States Patent [19]
Miura et al.

[11] 3,871,102
[45] Mar. 18, 1975

[54] MICROMETER

[75] Inventors: Ichiro Miura, Sumoto; Hiroshi Suzuki, Shizuki, Hyogo-ken, both of Japan

[73] Assignee: Nihon Sokutei Kogu Kabushiki Kaisha, Shizuki, Hyogo-ken, Japan

[22] Filed: Sept. 26, 1973

[21] Appl. No.: 400,817

[30] Foreign Application Priority Data
Oct. 6, 1972  Japan.......................... 47-117526

[52] U.S. Cl. ................................................ 33/166
[51] Int. Cl. ............................................ G01b 3/18
[58] Field of Search ............. 33/166, 163, 164, 165, 33/167

[56] References Cited
UNITED STATES PATENTS
| | | | |
|---|---|---|---|
| 1,350,185 | 8/1920 | Shaw...................................... | 33/166 |
| 2,691,224 | 10/1954 | Thielicke .............................. | 33/166 |
| 3,667,127 | 6/1972 | Tsugami................................ | 33/166 |

*Primary Examiner*—Harry N. Haroian
*Attorney, Agent, or Firm*—Wenderoth, Lind & Ponack

[57] ABSTRACT

A micrometer with a zero point adjustment device for a digital counter incorporated therein is disclosed. The micrometer comprises a substantially U-shaped frame, a first sleeve rotatably inserted into one end portion of the frame, a spindle penetrating the first sleeve and the one end portion of the frame, a second sleeve slidably but non-rotatably mounted on the spindle in the first sleeve, a counter means actuated by the rotation of the second sleeve which rotates simultaneously with the spindle, and a setting screw threaded into the frame so as to fix the first sleeve to the frame. The spindle is threaded in the first sleeve, thereby advancing and retreating the spindle by rotating it. When the setting screw is loosened the first sleeve is rotatable together with the spindle.

2 Claims, 2 Drawing Figures

PATENTED MAR 18 1975 3,871,102

MICROMETER

The present invention relates to a micrometer, and more particularly to a micrometer with a zero point adjustment device for a digital counter thereof.

In conventional micrometers, for adjusting the zero point thereof, the mounting mechanism of the counter had to be released, or the narrow internal gears had to be manually rotated, or the engagement between the spindle and the gears of the counter had to be released, thereby necessitating a complicated adjustment operation which required a great deal of time.

A primary object of the present invention is to obviate the defects of the conventional micrometers, and to provide a micrometer in which the adjustment of the zero point of the counter can be achieved very simply without approaching the internal mechanism.

Figure 1:
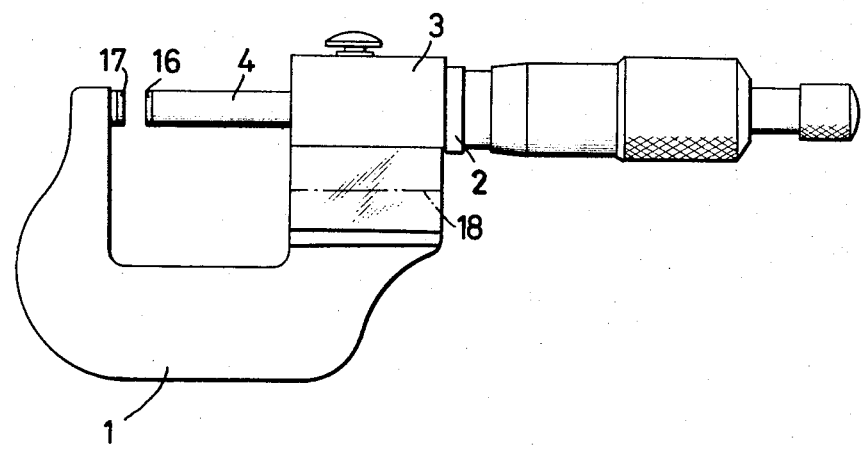
Figure 2:
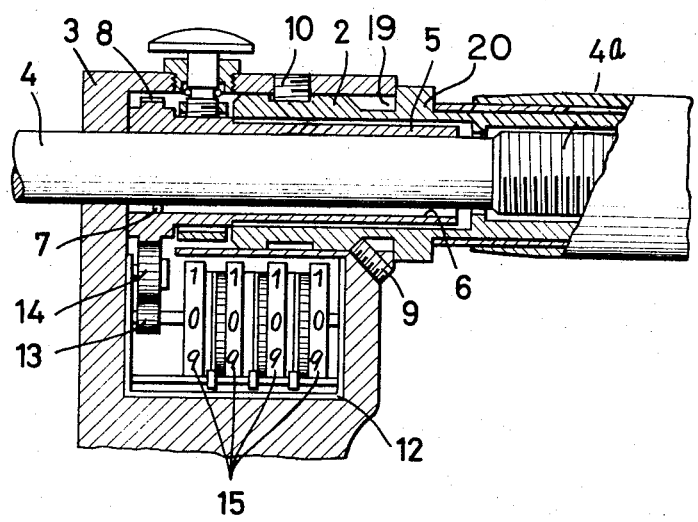

The above and further objects of the present invention will become apparent from the following detailed description of the invention in reference to the accompanying drawings, in which:

FIG. 1 is a side elevation of a micrometer according to the present invention; and FIG. 2 is an enlarged side elevation showing the main part of the micrometer, partially broken.

Referring now to the drawings, the numeral 1 designates a substantially U-shaped frame, a first sleeve 2 being tightly but rotatably inserted into a cylindrical member 3 formed on one side of said frame 1.

On the outer periphery of the frame adjacent to the exposed end of the inner sleeve 2 are provided an annular concave groove 19, encircling the portion inserted into the cylindrical member 2, and a flange 20 provided on the portion projecting from the cylindrical member 3.

Below the cylindrical member 3 of the frame 1 a screw 9 is mounted obliquely upward, the forward end of the screw 9 being brought into pressure contact with the concave groove 19 while permitting the rotation of the sleeve 2.

The screw 9 is adapted to prevent the rearward axial movement of the sleeve 2 relative to the cylindrical member 3, the forward axial movement of the inner sleeve 2 being prevented by the slidable abutment of the flange 20 against the outer end face of the cylindrical member 3, whereby the sleeve 2 is rotatably sustained without any play at the cylindrical member 3 under the effect of the screw 9 and the flange 20.

Into the upper part of the cylindrical member 3 of the frame 1 is screwed a set screw 10, the forward end thereof in pressure contact with the forward and outer periphery of the sleeve 2. In this manner the sleeve 2 may ordinarily be secured against rotation by tightening said set screw 10.

The numeral 4 designates a spindle which extends through the cylindrical member 3 of the frame 1 and is screwed by means of male portion 4a of the spindle 4 to said first sleeve 2 at the rear end portion thereof (not shown). Therefore the spindle 4 can be advanced and retreated by rotating it.

A second sleeve 5 is axially slidably mounted on the spindle 4. A narrow groove 6 is axially formed in the inner periphery of said second sleeve 5, a pin 7 fixed to the outer periphery of said spindle 4 being slidably engaged in said groove 6. By the engagement of said pin 7 with the groove 6, the second sleeve 5 rotates simultaneously with the spindle 4 when the latter is rotated, and at the same time the forward and backward movement of the spindle 4 is guided.

A gear 8 is formed on the front outer periphery of the sleeve 5.

A counter mechanism 12 is mounted in the frame 1 within the cylindrical member 3 thereof, a pinion 13 for actuating the counter 12 being provided so as to project therefrom. The pinion 13 meshes with an intermediate gear 14 which also meshes with said gear 8. Thus, when the spindle 4 is rotated the sleeve 5 rotates through the pin 7 to cause number rings 15 to rotate through the gears 8 and 14 and the pinion 13. As a result the movement of the spindle 4 along the first sleeve 2 is indicated by the advancement of the numbers on the number rings 15.

The operation of the zero point adjustment of the micrometer will now be explained.

When a measurement face 16 at the top of the spindle 4 tightly contacts anvil 17 at the inner face of the upper end of the frame 1, the numbers "zero" on the number rings 15 of the counter 12 should coincide with a base line 18 of the counter 12. If any deviation of "zero" from the base line 18 occurs, the zero point must be adjusted. In this adjustment, the setting screw 10 is loosened and the first sleeve 2 is rotated to cause the spindle 4 to rotate simultaneously therewith. To be more precise, if the set screw 10 is loosened and the sleeve 2 is rotated after the measurement surface 16 of the spindle has been brought into contact with the anvil 17, the sleeve 2 and the spindle 4 are rotated integrally, the spindle 4 being rotated without changing its position axially. Accordingly the number rings 15 of the counter 12 rotate through the gear 8 of the second sleeve 5. When the numbers "zero" of the number rings 15 coincide with the base line 18, the setting screw 19 is tightened to fix the first sleeve 2 to the frame 1, whereby the zero point adjustment of the micrometer is completed.

The adjustment can also be effected when a space exists between the measurement surface 16 of the spindle and the anvil 17 and when the counter mechanism 12 has a erroneous indication of the space.

In this case, the set screw 10 is loosened and the sleeve 2 is rotated while spindle 4 is held so as not to rotate. The spindle 4 is axially moved by the rotation of the sleeve 2, whereby the space between the measurement surface 16 and the anvil 17 is adjusted so as to coincide with the digits. Since the spindle 4 is not rotated, the digital rings of the counter mechanism 12 are free from change.

As mentioned above according to the present invention, the zero point of the spindle and that of the counter can be made to coincide by simply loosening the setting screw of the first sleeve and rotating the first sleeve relatively to the frame whereby the zero point adjustment can be conducted externally without touching the internal mechanism.

We claim:

1. A micrometer, comprising:
   a substantially U-shaped frame;
   a hollow cylindrical member formed on one side of said frame;
   a first sleeve having a first portion rotatably positioned within said cylindrical member and a second portion extending therefrom;
   a spindle positioned in said first sleeve and said cylindrical member and extending through and projecting from said cylindrical member toward the other end of said U-shaped frame, said spindle being threaded in the region thereof corresponding to the portion of said first sleeve extending from said cylindrical member, said first sleeve being correspondingly threaded;

a second sleeve slidably mounted on said spindle within said cylindrical member and interposed between said spindle and said first sleeve, said second sleeve having an axial groove in the periphery thereof and having a gear formed about the periphery thereof;

a pin fixed to the outer periphery of said first spindle and slidably engaged in said axial groove of said second sleeve;

a counter means having a gear meshing with said gear of said second sleeve; and a setting screw extending through the periphery of said cylindrical member and adapted to contact said first sleeve for locking said first sleeve, said setting screw adapted to be rotated from a position externally of said cylindrical member for separating said setting screw from said sleeve for releasing said first sleeve, whereby adjustment may be readily accomplished.

2. The device of claim 1 wherein said first sleeve has an annular groove in its outer periphery and a flange on the outer periphery of the portion extending from said cylindrical member and abutting an end face of the cylindrical member, and further comprising a screw inserted into the end portion of said cylindrical member, a forward end of said screw being positioned within the groove of said first sleeve and contacting a side wall of said groove, whereby the first sleeve may be maintained in position.

* * * * *